United States Patent [19]

Barnes et al.

[11] 4,130,628
[45] Dec. 19, 1978

[54] PROCESS FOR REMOVING $SO_2$ AND $NO_x$ FROM GASES

[75] Inventors: Hubert L. Barnes, State College; Edward Shapiro, Pittsburgh, both of Pa.

[73] Assignee: Pittsburgh Environmental and Energy Systems, Inc., Pittsburgh, Pa.

[21] Appl. No.: 826,962

[22] Filed: Aug. 22, 1977

[51] Int. Cl.² ............................................. C01B 21/00
[52] U.S. Cl. ................................... 423/235; 423/242; 423/561 R; 423/571
[58] Field of Search ............... 423/235, 239, 242, 244, 423/561, 571

[56] References Cited

U.S. PATENT DOCUMENTS

| | | |
|---|---|---|
| 1,062,120 | 5/1913 | Sanborn et al. ...................... 423/242 |
| 1,976,704 | 10/1934 | Ward et al. .......................... 423/239 |
| 3,695,828 | 10/1972 | Gertsen et al. ...................... 423/239 |
| 3,784,680 | 1/1974 | Strong et al. ....................... 423/242 |
| 3,920,421 | 11/1975 | Collins ................................ 423/242 |
| 4,008,169 | 2/1977 | McGauley ........................... 423/244 |

Primary Examiner—O. R. Vertiz
Assistant Examiner—Thomas W. Roy
Attorney, Agent, or Firm—James J. Brown

[57] ABSTRACT

A method is disclosed for scrubbing $SO_2$ and $NO_x$ containing gases with iron sulfide. The reaction proceeds only to the formation of $FeS_2$ and $FeSO_4$ without significant formation of sulfur or iron oxide. The reaction products are subsequently regenerated to FeS by heating and can be recycled for further scrubbing operations; elemental sulfur is recovered as a by-product.

4 Claims, 1 Drawing Figure

PROCESS FOR REMOVING SO₂ AND NOₓ FROM GASES

The present invention is directed to a low energy process for removing sulfur oxides and nitrogen oxides from other gases, such as stack gases, wherein iron sulfide is used as the principal agent for removing the said oxides. More specifically, the present invention is concerned with a process whereby ferrous sulfide is used to remove sulfur oxides and nitrogen oxides from waste gases under carefully controlled conditions so that the eventual formation of elemental sulfur is avoided in favor of formation of sulfur-rich iron sulfides such as iron disulfide, which can be regenerated to ferrous sulfide and subsequently employed for further SO₂—NOₓ removal, with significantly less expenditure of energy than is required for a similar regeneration from elemental sulfur and iron oxide.

BACKGROUND OF THE INVENTION

Sulfur dioxide and/or oxides of nitrogen emissions and the products of their atmospheric conversion are significant hazards to human health, welfare, and safety. Their presence is associated with an estimated 25,000 deaths yearly, prolonged upper respiratory and lung damage, and aggravation of chronic respiratory ailments. Additional adverse effects of sulfur oxides pollution on man's welfare and safety encompass such serious environmental ecological consequences as reduced crop yields, inhibited forestation and fish growth, reduced sunlight, accelerated materials corrosion and restricted visibility.

Various procedures have been suggested in the prior art for removing contaminates such as sulfur dioxide from gas streams. For example, the use of alkaline agents such as limestone, lime, ammonia, or sodium hydroxide to remove SO₂ from combustion gases occurs by the reactions:

$$Ca(OH)_2 + H_2O + SO_2 \rightarrow CaSO_3 + H_2O$$

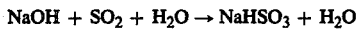
$$NaOH + SO_2 + H_2O \rightarrow NaHSO_3 + H_2O$$

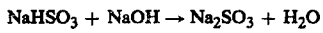
$$NaHSO_3 + NaOH \rightarrow Na_2SO_3 + H_2O$$

$$(NH_4)OH + SO_2 + H_2O \rightarrow (NH_4)HSO_3 + H_2O$$

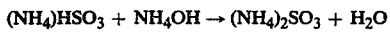
$$(NH_4)HSO_3 + NH_4OH \rightarrow (NH_4)_2SO_3 + H_2O$$

The principal disadvantages of such means to remove sulfur dioxide from combustion gases are that the alkaline reagents must be purchased or otherwise acquired, usually at some cost, and that the resulting bisulfites which present a waste disposal problem are corrosive and of little or no value. Another disadvantage of utilizing these alkaline reagents is their lack of reactivity with oxides of nitrogen and, therefore, their inability to effectively remove them from the gas stream.

The use of both metallic or non-metallic sulfides has also been proposed for removing SO₂ from gas streams. Frequently, however, the sulfides used have been relatively water soluble and basic. Thus, while these alkaline sulfides are effective to an extent in removing SO₂, they often do so with formation of large amounts of bisulfites, which must be disposed of, and/or the evolution of hydrogen sulfide.

Iron sulfide slurry is uniquely appropriate for removing SO₂ from gas streams, since its low solubility in water and stability in mildly acid environments make possible the reaction:

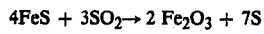
$$4FeS + 3SO_2 \rightarrow 2Fe_2O_3 + 7S$$

without significant sulfite formation.

Although this procedure is advantageous where no re-use or re-cycling of the sulfur and Fe₂O₃ product is contemplated, the high consumption of energy to regenerate FeS makes the process somewhat less efficient where such recycling is planned and efficiency of SO₂ is somewhat diminished.

It is therefore an object of the present invention to provide a process for removing SO₂ and NOₓ from gas streams which is economical and practical from the standpoint of both SO₂ removal, materials used, products recovered and energy consumption and which precludes formation of quantities of unwanted waste products or residue.

According to the present invention, gases containing either sulfur dioxide, or nitrogen oxides, or both, are scrubbed with particulate ferrous sulfide in the presence of moisture such as an aqueous slurry at a controlled pH above 5.5 and preferably 5.5 to 7.5 and a temperature of ambient to 100° C. to form sulfur-rich iron sulfides, iron disulfide and iron sulfate. The reaction is controlled with regard to duration of reaction, pH, temperature and proportion of FeS to SO₂ so as not to proceed to the formation of elemental sulfur and iron oxide. The iron disulfide and sulfate are then dissociated to ferrous sulfide (FeS) and sulfur by heating them at a temperature of 650° C. to 900° C. in a dry, reducing atmosphere. If the dissociation of the iron disulfide and iron sulfate are carried out in an inert atmosphere, rather than a reducing atmosphere, formation of the intermediate product pyrrhotite occurs. The sulfur, which is vaporized upon dissociation, can be later recovered by condensation and the iron sulfide is recycled for further scrubbing. It is particularly important, however, that the reaction of SO₂ or NOₓ with the ferrous sulfide during the scrubbing operation be terminated prior to the significant formation of elemental sulfur and Fe₂O₃ since considerably more energy is needed to convert these compounds to ferrous sulfide and greater efficiency of SO₂ removal is thereby realized.

The basic system chemistry between the reagent ferrous sulfide and the sulfur dioxide and nitrogen oxide gases is:

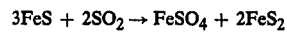
$$3FeS + 2SO_2 \rightarrow FeSO_4 + 2FeS_2$$

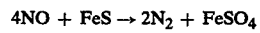
$$4NO + FeS \rightarrow 2N_2 + FeSO_4$$

Nitric Oxide (NO) is used to represent nitrogen oxides since it typically comprises the bulk of the nitrogen oxides in combustion gases.

By virtue of the hydrolysis of ferrous sulfide in the scrubbing procedure, the pH during reaction with the SO₂ and NOₓ will tend to maintain itself within the required range. Should the pH fall below about 5.5 however (thereby encouraging formation of Fe₂O₃, bisulfites and some H₂S) an alkaline agent can be used to elevate the pH. Ordinarily the duration of the actual contact time in the scrubber will be in the order of about 1–8 seconds. In order to avoid having the reaction of the SO₂ and FeS proceed to formation of Fe₂O₃ and sulfur, it is also important that the mole ratio of FeS to $SO_2$ be maintained greater than a minimum of 1.5 to 1 and preferably 3 to 1.

The transition from FeS to $FeS_2$ passes through the representative iron sulfide compounds presented in Table 1. These intermediate compounds, as well as the final disulfide, are typical of the complex crystal lattice structures that iron sulfide is capable of forming. It is the ability to hydrolyze to buffer the pH in the proper range and also to form the intermediate sulfides and eventually the disulfide that make iron sulfide unique among sulfides such as the sulfides of alkali and alkaline earth elements.

Scrubbing of the $SO_2$ and or $NO_x$ containing gas can be carried out using conventional scrubbing techniques as long as the proper conditions of temperature, pH and duration of reaction are observed. Ranges and typical conditions and procedures for this scrubbing are as follows:

Scrubber L/G ratio 35–150(100) gpm/1000scfm
Inlet flue gas temp. 100°–350° C. (230° C.)
Outlet flue gas temp. 50°–70° C. (60° C.)
FeS Slurry temp. 50°–70° C. (60° C.)
FeS Slurry Concentration 2–6%
FeS Slurry pH 5.5–7.5
Duration of reaction 1–8 second Typical conditions for regeneration of the iron disulfide to ferrous sulfide are as follows:

TABLE 1

| Regeneration Temperature Reducing Atmosphere | 650°–850° C (750° C) |
|---|---|
| Retention in Kiln | 2–5 (3) minutes |

| MINERAL | FORMULA | STRUCTURE |
|---|---|---|
| Mackinawite | $Fe_9S_8$ | Tetrahedral |
| Troilite | FeS | Hexagonal |
| Pyrrhotite | $Fe_{11}S_{12}$ $Fe_{10}S_{11}$ $Fe_9S_{10}$ | Hexagonal |
| Pyrrhotite | $Fe_7S_8$ | Monoclinic |
| Smythite | $Fe_9S_{11}$ | Rhombohedral |
| Greigite | $Fe_3S_4$ | Cubic |
| Marcasite | $FeS_2$ | Hexagonal |
| Pyrite | $FeS_2$ | Cubic |

FIG. 1 is a schematic drawing of the process of the invention.

DESCRIPTION OF PREFERRED EMBODIMENT

Figure 1:
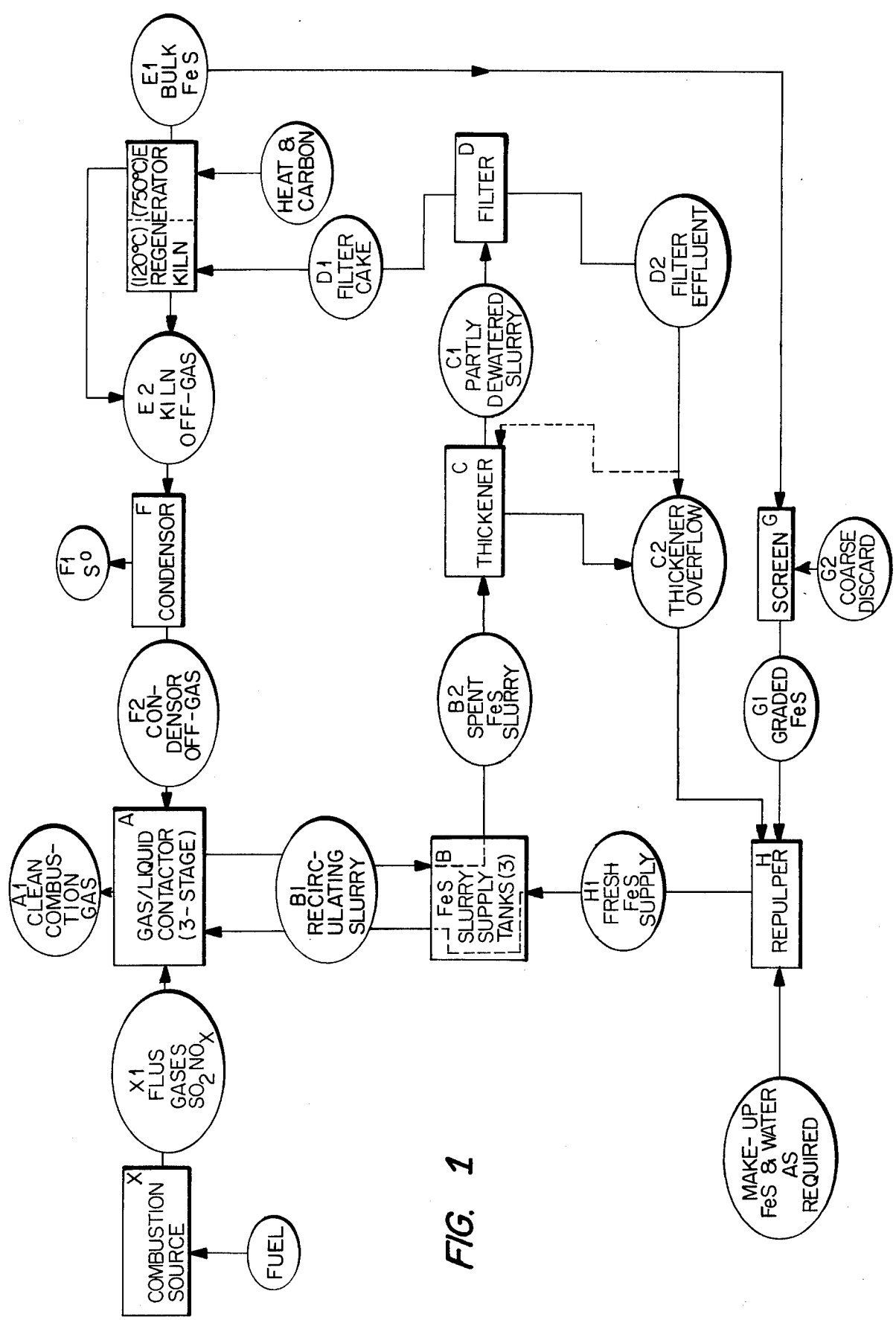

As described in FIG. 1, combusted gases containing $SO_x$ and/or NO (XI) are contacted with the ferrous sulfide slurry (B1) in a scrubbing unit (A). Clean gases (A1) exit the scrubber and partially spent slurry (B2) overflows from the scrubber recirculation basin (B). The spent slurry overflow is caused by, and is proportional to, the fresh slurry feed (H-1) which is automatically added to maintain sufficient ferrous sulfide for reaction with the incoming $SO_x$–$NO_x$ gases.

The spent slurry is dewatered in thickener (C) and filter (D) in order to minimize the energy consumed in evaporating the moisture entrained in the filter cake and to preclude the formation of significant $H_2S$ during the regeneration step that is performed in the kiln (E). The regenerated ferrous sulfide (E1) is screened and resuspended in repulper (H). The aqueous liquor used to resuspend the ferrous sulfide is a combination of the effluent (C2) and the filtrate (D2) from the dewatering steps.

The combustion gases and vaporized sulfur (E2) from the kiln are cooled in condensor (F) to remove the sulfur and the remainder of the gases (F2) is directed to the scrubber (A) for final cleaning before being discharged.

The conditions employed during the stages of the process are described in Table 2.

TABLE 2

SYSTEM COMPONENT FUNCTIONS AND INPUT/OUTPUT GASES, LIQUIDS, SOLIDS

| INPUT | DEVICE | OUTPUT |
|---|---|---|
| *13 lb/min. Hi-Sulfur Coal | X Coal-Fired Boiler Heat Generation | XI (232° C) 4,290 ACFM $SO_2$, $NO_x$ |
| X1-4, 290 ACFM, B1-215 GPM FeS in Aqueous Slurry, F2-150 ACFM (similar to X1) | A 3-Stage modified Eductor Venturi Gas Cleaning | A1-(57° C) 2,900 ACFM B1-215 GPM FeS |
| B1-215 GPM FeS H1-Fresh FeS supply (as required) | B Slurry Recirculator & Supply Tanks (3) | B1-215 GPM FeS B2-10 GPM 5.8% Slurry FeS, $FeS_2$, $FeSO_4$ |
| B2-10 GPM Slurry, D2-(alternate) 4 GPM Fine Solids in filtrate not Retained by Filter | C 5350 gal. Capacity Thickener w/rake Slurry Concentration | C1-5 GPM 11.5% Solids in Aqueous Slurry C2-5 + 4 = 9 GPM Effluent With Trace of Suspended Solids |
| C1-5 GPM 11.5% Solids | D Rotary Vacuum Filter Slurry Dewatering | D1-1 GPM 60% Solids FeS, $FeS_2$, $FeSO_4$ D2-4 GPM Filtrate |
| D1-1 GPM 60% Solids *Heat & Carbon & make up pyrites (as required) | E Rotary Kiln Reducing Atmo: Drying and Thermal Regeneration | E1-5 lbs/min. Bulk FeS E2-(450° C) 180 ACFM 0.4 lbs/min. Sulfur in Off-gas |
| E2-180 ACFM; .4 lb/min. Sulfur | F Shell & Tube Heat Exchange, Sulfur Vapor Condensation | F1-S° F2-(343° C) 150 ACFM Kiln Off-gas Vapor |
| E1-5 lbs/min. Dry FeS | G Vibrating Screen Agglomerate Discard | G1-4.9 lbs/min. FeS thru Screen Fine Particle Size G2-0.1 lbs/min. Agglomerates Course Cut Discard |
| G1-4.9 lbs/min. FeS C2-9 GPM Thickener Effluent, *Make-up Water | H Repulper Mix Tank | H-1-Fresh FeS |

*External Source

EXAMPLE 1

A 2% by weight aqueous slurry of ferrous sulfide (FeS) was recirculated through a gas/liquid contactor. The gas/liquid contact period in the venturi throat was approximately 1 second where the bulk reaction between $SO_2$ and FeS occurred. A gas stream containing 1500 p.p.m. sulfur dioxide was drawn into the scrubber and intimately contacted with the FeS slurry. The scrubbing slurry and existing gas was approximately 45° C. The pH of the slurry was 7.2 at the start of the test and 5.5 at the finish. The concentration of sulfur dioxide in the gas exiting the contactor varied from 15 p.p.m. at the start to 150 p.p.m. when the test was terminated after approximately 50 minutes.

The same procedure was repeated several times; each time with fresh FeS slurry. The used slurry at the end of each test was composited for further testing. Subsequent analyses indicated the presence of significant marcasite/pyrite concentrations.

The used slurry was divided into aliquots and each aliquot dewatered prior to subsequent heating studies. These studies were conducted to determine the conditions needed to regenerate the solids from the used slurry so that they could be recycled to the gas scrubbing operation.

The dewatered solids were heated in a tube furnace to different temperatures and in several controlled atmospheres. Once the highest temperature for each test was achieved, it was held for approximately 2 minutes before the same was cooled and analyzed. Results of the analyses are as follows:

| Test | Temperature (Max.) °C | Atmosphere Type | Average Final Solids Composition |
|---|---|---|---|
| 1 | 800 | Closed* | $Fe_{10}S_{11}$ |
| 2 | 450 | Closed | $FeS_2$ |
| 3 | 450 | Closed | $FeS_2$ |
| 4 | 450 | Nitrogen | $FeS_2$ |
| 5 | 800 | Carbon Monoxide | FeS |
| 6 | 750 | Carbon Monoxide | FeS |

*Closed - Tube constructed to prevent inspiration of fresh air; gases and sulfur vapor expanded by the heating process were vented.

EXAMPLE 2

A slip stream, approximately 2500 SCFM, of flue gas from a coal-fired boiler was drawn through a 3-stage eductor venturi scrubber and brought into intimate contact with a 4% by weight aqueous ferrous sulfide slurry. The scrubber L/G ratio was 10 gpm/1000 CFM.

The flue gas from the boiler contained average concentrations of 1049 ppm sulfur dioxide ($SO_2$) and 470 ppm nitrogen oxides ($NO_x$). The temperature of this gas was approximately 232° C. The concentrations of $SO_2$ and $NO_x$ discharged from the scrubber were 81 ppm and 179 ppm, respectively. Typical residence time in the reactor sections of the scrubber was approximately 7 seconds. The temperature of exit gas was 59° C.

The feed slurry pH was approximately 8 and the average pH of the used slurry that was discharged from the scrubber was 5.5

Analyses of the solids in the used slurry indicated the stepwise procession from ferrous sulfide to marcasite/pyrite ($FeS_2$) by the presence of pyrrhotite ($Fe_7S_8$) and smythite ($Fe_9S_{11}$). The presence of these sulfur-rich iron sulfides indicated that sulfur dioxide absorption could have been carried much further without having exhausted the ferrous sulfide slurry.

A particularly advantageous feature of the present invention is the reduced expenditure of energy and materials required to accomplish significant reductions in $SO_2$ and $NO_x$ levels in gases. For example, because the present process contemplates reforming and re-using the FeS scrubbing material, the requirement for this component is decreased. Further, a valuable product, sulfur, is obtained on regeneration of the $FeS_2$ and $FeSO_4$. In contrast with the present invention, also, methods of scrubbing $SO_2$ and $NO_x$ containing gases with FeS which produces $Fe_2O_3$ and sulfur directly have been found to use a total of about 60% more energy for regeneration than required by the present process.

If necessary, however, naturally occurring pyrites can be used for example, as a supplement, prior to regeneration; to make up for any losses of FeS that may occur in the process.

We claim:

1. A process for removing sulfur dioxide and nitrogen oxides from gases which comprises:
   a. Scrubbing said gases in a scrubber with ferrous sulfide in the presence of $H_2O$ wherein the mole ratio of FeS to $SO_2$ in the scrubber is at least 1.5 to 1 at a temperature of ambient to 100° C. and a pH of at least 5.5, to produce $FeS_2$ and $FeSO_4$ with minimal formation of $Fe_2O_3$ and sulfur;
   b. Removing said $FeS_2$ and $FeSO_4$ and heating in a reducing atmosphere at a temperature of 650° to 900° C. to regenerate said FeS and form sulfur;
   c. Recycling said regenerated FeS to said scrubber to scrub additional $SO_2$ and $NO_x$ containing gases.

2. The process of claim 1 wherein said mole ratio is at least 3 to 1.

3. The process of claim 1 wherein the residence time in said scrubber is 1-8 seconds.

4. The process of claim 1 wherein naturally occurring pyrites is added as make-up prior to regeneration of FeS from said $FeS_2$ and $FeSO_4$.